United States Patent
Blakstad et al.

(10) Patent No.: US 11,993,373 B2
(45) Date of Patent: May 28, 2024

(54) UNMANNED AERIAL VEHICLE

(71) Applicant: GRIFF AVIATION AS, Sykkylven (NO)

(72) Inventors: Svein Even Blakstad, Sykkylven (NO); Jan Martin Nysæter, Sykkylven (NO)

(73) Assignee: GRIFF AVIATION AS, Sykkylven (NO)

( * ) Notice: Subject to any disclaimer, the term of this patent is extended or adjusted under 35 U.S.C. 154(b) by 929 days.

(21) Appl. No.: 16/962,491

(22) PCT Filed: Jan. 17, 2019

(86) PCT No.: PCT/NO2019/050008
§ 371 (c)(1),
(2) Date: Jul. 15, 2020

(87) PCT Pub. No.: WO2019/143255
PCT Pub. Date: Jul. 25, 2019

(65) Prior Publication Data
US 2021/0078704 A1     Mar. 18, 2021

(30) Foreign Application Priority Data
Jan. 17, 2018   (NO) .................................. 20180080

(51) Int. Cl.
*B64C 39/02*    (2023.01)
*B60L 50/60*    (2019.01)
(Continued)

(52) U.S. Cl.
CPC ............ *B64C 39/024* (2013.01); *B60L 50/64* (2019.02); *B60L 50/66* (2019.02); *B60L 58/10* (2019.02);
(Continued)

(58) Field of Classification Search
CPC ........ B64C 39/024; B60L 50/64; B60L 50/66; B60L 58/10; B60L 2200/10; B64D 27/24;
(Continued)

(56) References Cited

U.S. PATENT DOCUMENTS 9,409,645 B1     8/2016 Sopper et al.
10,569,873 B2 *  2/2020 Chen ..................... B64C 39/024
(Continued)

FOREIGN PATENT DOCUMENTS

CN     106995052 A    8/2017
CN     206476093 U    9/2017
(Continued)

OTHER PUBLICATIONS

The International Search Report and the Written Opinion of the International Searching Authority issued in corresponding International Application No. PCT/NO2019/050008 dated Apr. 3, 2019.
(Continued)

*Primary Examiner* — Medhat Badawi
*Assistant Examiner* — Vicente Rodriguez
(74) *Attorney, Agent, or Firm* — ArentFox Schiff LLP

(57) ABSTRACT

An unmanned aerial vehicle, having a main body comprising at least an elongate backbone with a forward end piece and a rearward end piece. The end pieces are wider than the backbone and comprise coupling facilities for respective rotor arms, each said rotor arm configured for supporting motor and propeller assemblies. The unmanned aerial vehicle further comprises a pair of elongated batteries. The end pieces and at least a portion of the backbone form receptacles on both sides of the backbone for releasably receiving respective electric batteries, wherein the batteries, backbone and end pieces form an elongate and substantially rectangular body assembly.

10 Claims, 9 Drawing Sheets

(51) Int. Cl.
*B60L 50/64* (2019.01)
*B60L 58/10* (2019.01)
*B64C 1/30* (2006.01)
*B64D 27/24* (2006.01)
*B64D 47/08* (2006.01)
*H01M 50/20* (2021.01)
*B64U 10/13* (2023.01)
*B64U 30/20* (2023.01)
*B64U 50/19* (2023.01)

(52) U.S. Cl.
CPC ............... *B64C 1/30* (2013.01); *B64D 27/24* (2013.01); *B64D 47/08* (2013.01); *H01M 50/20* (2021.01); *B60L 2200/10* (2013.01); *B64U 10/13* (2023.01); *B64U 30/20* (2023.01); *B64U 50/19* (2023.01); *H01M 2220/20* (2013.01)

(58) Field of Classification Search
CPC ........ B64D 47/08; B64U 10/13; B64U 30/20; B64U 50/19; B64U 10/10; Y02E 60/10; H01M 50/20; H01M 2220/20
See application file for complete search history.

(56) References Cited

U.S. PATENT DOCUMENTS

| | | | |
|---|---|---|---|
| 10,710,701 B2* | 7/2020 | Tian | B64C 1/30 |
| 10,870,477 B1* | 12/2020 | Nilson | B64C 39/024 |
| 2010/0178547 A1* | 7/2010 | Li | H01M 50/258 |
| | | | 429/151 |
| 2014/0061376 A1 | 3/2014 | Fisher et al. | |
| 2014/0151496 A1 | 6/2014 | Shaw | |
| 2015/0232181 A1 | 8/2015 | Oakley et al. | |
| 2018/0118322 A1* | 5/2018 | Harris | B64C 1/063 |
| 2018/0354620 A1* | 12/2018 | Baek | B64C 39/024 |
| 2019/0071178 A1* | 3/2019 | Caubel | B64C 27/50 |
| 2020/0115055 A1* | 4/2020 | Kuperman | B64C 39/024 |

FOREIGN PATENT DOCUMENTS

| | | |
|---|---|---|
| EP | 3210659 A1 | 8/2017 |
| KR | 101527544 B1 | 6/2015 |
| WO | 2008147484 A2 | 12/2008 |
| WO | 2016148784 A1 | 9/2016 |
| WO | 2017053634 A1 | 3/2017 |
| WO | 2017143501 A1 | 8/2017 |
| WO | 2017185487 A1 | 11/2017 |

OTHER PUBLICATIONS

Digdat0: "DJI Mavic—Mount up Dual batteries", ' Sep. 22, 2017 (Sep. 22, 2017), p. 1, XP054979188, Retrieved from the Internet: URL:https://www.youtube.com/watch?v=YUYiV8RJPbQ [retrieved on Mar. 5, 2019] the whole document.
Examination Report issued in corresponding Australian Application No. 2019209760 dated Jan. 31, 2024.

* cited by examiner

UNMANNED AERIAL VEHICLE

This application is a 35 U.S.C. § 371 National Phase of PCT Application No. PCT/NO2019/050008, filed Jan. 17, 2019, which claims priority to Norwegian Application No. 20180080, filed Jan. 17, 2018, the disclosures of which are hereby incorporated by reference herein.

FIELD OF THE INVENTION

The present invention relates to an unmanned aerial vehicle (UAV), as specified in the preamble of the accompanying patent claims.

BACKGROUND OF THE INVENTION

Unmanned, remotely operated or autonomous, aerial vehicles have gained much popularity in recent years. Such vehicles, which are commonly referred to as drones, are now widely used for aerial photography and surveillance, transportation of cargo, etc., by professionals in law enforcement agencies and rescue organizations. There is thus a demand for drones that can carry comparably heavy loads, may be transported to a site in a compact state, and rapidly be deployed and ready for flight.

The prior art includes WO 2008/147484 A2, which describes a modular vehicle having an air vehicle that can be coupled to cargo containers, land vehicles, sea vehicles, medical transport modules, etc. In one embodiment the air vehicle has a plurality of propellers positioned around a main airframe, which can provide vertical thrust and/or horizontal thrust. One or more of the propellers may be configured to tilt forward, backward, and/or side-to-side with respect to the airframe.

The prior art also includes KR 10-1527544 B1, which describes a drone which can reduce its volume when it is not in use. The drone airframe has an oblong shape, and the drone arms (to which the rotors are mounted) are pivotable to fold along the airframe. The width of the frontal part of the airframe is greater than that of the rear part, thereby allowing the front and rear arms to be folded side-by-side, and not overlapping with each other.

An object of the present invention is to provide a highly reliable and long-term stable rotor-wing multicopter type and rapidly deployable aerial vehicle with a plurality of motors, advantageously operable as a drone, and designed to carry heavy cargo loads, fixed to the fuselage or connected to the drone by slings. The loads may be in a range from about 5 kg to about 500 kg.

The inventors have found that a rapidly deployable aerial vehicle having a rotating wing lift generating means, advantageously a rapidly deployable unmanned aerial vehicle (UAV), such as rapidly deployable unmanned multicopter, embodied with a unitary main fuselage and advantageously embodied with a swingable arm mount as illustrated and described herein, exhibits advantageous properties and capabilities that makes it highly desirable for use in applications where a manned aircraft, such as a manned airplane or a manned helicopter, involves high risk or high cost on personnel or equipment or meets other substantial limitations on its operation that prohibits its use, in particular in an emergency situation under adverse operating conditions. The apparatus of the present invention in particular capable of providing fast deployment and be ready for action in a matter of minutes with a stability that remains substantially unchanged over time.

SUMMARY OF THE INVENTION

The invention is set forth and characterized in the main claim, while the dependent claims describe other characteristics of the invention.

It is thus provided an unmanned aerial vehicle, having a main body comprising at least an elongate main frame ("backbone") with a forward end piece and a rearward end piece, characterized in that said end pieces are wider than the backbone and comprising coupling facilities for respective rotor arms, each said rotor arm configured for supporting motor and propeller assemblies; the unmanned aerial vehicle further comprises a pair of elongated batteries; the end pieces and at least a portion of the backbone form receptacles on both sides of the backbone for releasably receiving respective electric batteries, wherein the batteries, backbone and end pieces form an elongate and substantially rectangular body assembly.

In one embodiment, each rotor arm comprises an arm inner part having on one end a coupling arrangement adapted for coupling to the end piece and on a second end a first part of an arm folding hinge, and an arm outer part having on one end an adapter for said motor and propeller assemblies and on a second end a second part of the arm folding hinge, and a displaceable and spring biased hinge lock arrangement disposed in a first one of the arm inner and outer parts. The arm may further comprise a spring biased cotter pin adapted to enter a hole in the other one of the arm inner and outer parts when aligned in an unfolded position.

The invention provides a swingable arm mount for an aerial vehicle having a lift generating means, the aerial vehicle being advantageously a multicopter.

Accordingly, it is contemplated that the invention can provide an unmanned multicopter having a main body comprising an elongate "backbone" (central body/fuselage) made from a unitary piece of light metal extruded profile having a first end and a second end and therein four elongate cavities and at least one outer "backbone" long side and other profile features, such as for example a mounting track for attaching thereto equipment like a camera foot and the like, a forward end piece for mounting on the first end of the "backbone", and which has a width where it is to be mounted to the "backbone" that is wider than the backbone and provides at least a first and a second forward shoulder which each comprises a coupling facility for a rotor arm, optionally also a forward mounting facility for an undercarriage (at least one leg), a rearward end piece for mounting on the second end of the "backbone", and which has a width where it is to be mounted to the "backbone" that is wider than the backbone and provides at least a first and a second rearward shoulder which each comprises a coupling facility for a rotor arm, optionally also a rearward mounting facility for an undercarriage (at least one leg), a bow end cap, a stern end cap, an optional forward adapter plate providing a forward mounting facility for and an adapter between the forward end piece and the bow end cap, an optional rearward adapter plate providing a forward mounting facility for and an adapter between the rearward end piece and the stern end cap, and four foldable rotor arms, each comprising an inner arm part having on one end a coupling arrangement adapted for coupling to the coupling facility of an end piece and on a second end a first part of an arm folding hinge, and an outer arm part having on one end an adapter for a rotor assembly and on a second end a second part of the arm folding hinge, and a displaceable and spring biased hinge lock arrangement disposed in a first one of the inner and outer arm parts and comprising a spring biased cotter pin adapted to enter a hole in the other one of the inner and outer arm parts when aligned in an unfolded position, and four rotor assemblies each comprising at least a propeller on a motor on a rotor mount attached to a respective one of the adapters for a rotor assembly. Preferably, the invention can provide an unmanned multicopter having at least one elongate energy container, preferably an electric battery, having a first end, a second end and an outer battery long side adapted for being positioned adjacent to at least one long side of the "backbone", and which has on at least one of the first and second ends an attaching arrangement being adapted to be in fastening engagement with at least one co-operating attaching means arranged on at least one of the forward and rearward end pieces.

BRIEF DESCRIPTION OF THE DRAWINGS

The above and other characteristics of the invention will become clear from the following description of a preferential form of embodiment, given as a non-restrictive example, with reference to the attached schematic drawings, wherein.

DETAILED DESCRIPTION OF AN EMBODIMENT OF THE INVENTION

Figure 1:
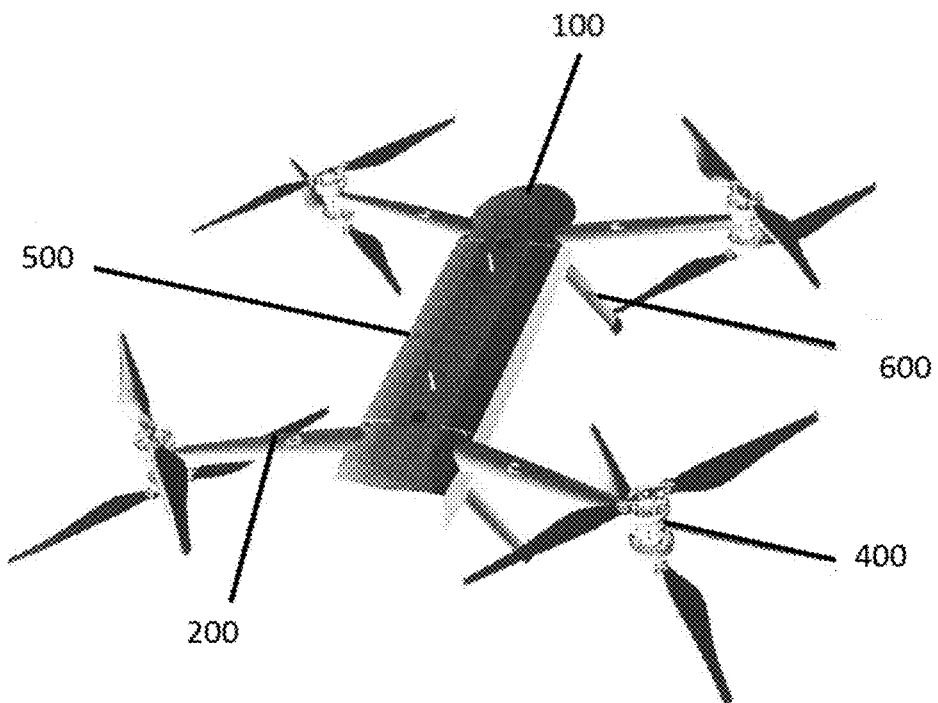
FIG. 1 is a first perspective view drawing, illustrating seen from above an embodiment of a multicopter drone according to the invention complete and ready for flight.

The following description may use terms such as "horizontal", "vertical", "lateral", "back and forth", "up and down", "upper", "lower", "inner", "outer", "forward", "rearward", etc. These terms generally refer to the views and orientations as shown in the drawings and that are associated with a normal use of the invention. The terms are used for the reader's convenience only and shall not be limiting.

For simplicity in the following description, the assembly comprising a complete rotor arm and a rotor assembly comprising motor mount, motors and propellers is frequently referred to as the "arm". The drone body comprising a main frame (commonly referred to as a "backbone"), end pieces, end caps and components mounted thereon, but without the batteries, arms and undercarriage, is frequently referred to as the "body".

Reference is first made to the drawing of FIGS. 1 to 4, illustrating a complete rotor-wing multicopter according to an embodiment of the invention in a configuration with arms 200 deployed and extending out from the body 100 and locked in a fully deployed state, ready for flight. FIG. 1 shows main assemblies and components such as the body 100 with a pair of batteries 500 mounted thereon, so as to form an elongate and substantially rectangular body assembly. A plurality of rotor arms 200 with rotor assemblies 400, and an undercarriage including a plurality of legs 600, are mounted on the body 100.

Figure 2:
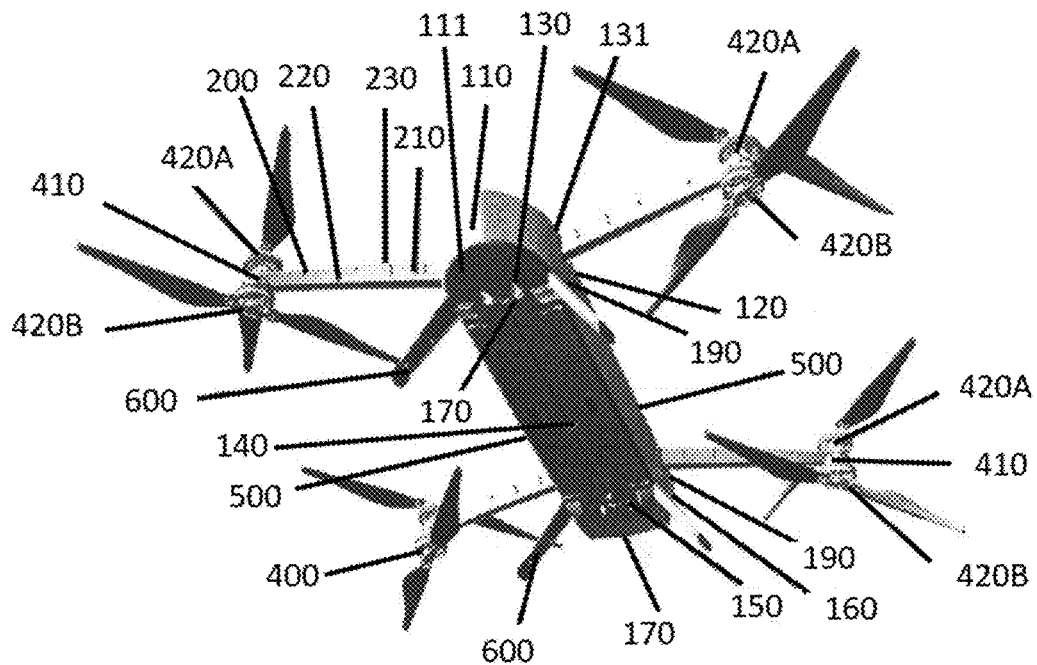
FIG. 2 is a second perspective view drawing, illustrating seen from below the embodiment of a multicopter drone according to the invention illustrated in FIG. 1.

FIG. 2 shows components and sub-assemblies of the body 100, such as a forward endcap 110 with sensor windows 111, an optional forward adapter plate 120, a forward end piece 130, a backbone 140, a rearward end piece 150, an optional rearward adapter plate 160, a stern endcap 170, battery locking arrangements 190, components and subassemblies of the arms 200, such as arm inner part 210, arm outer part 220, and arm folding hinge locking arrangement 230, and components and subassemblies of the rotor assemblies 400, such as rotor mounts 410, upper motor and propeller assemblies 420A, and lower motor and propeller assemblies 420B.

Figure 3:
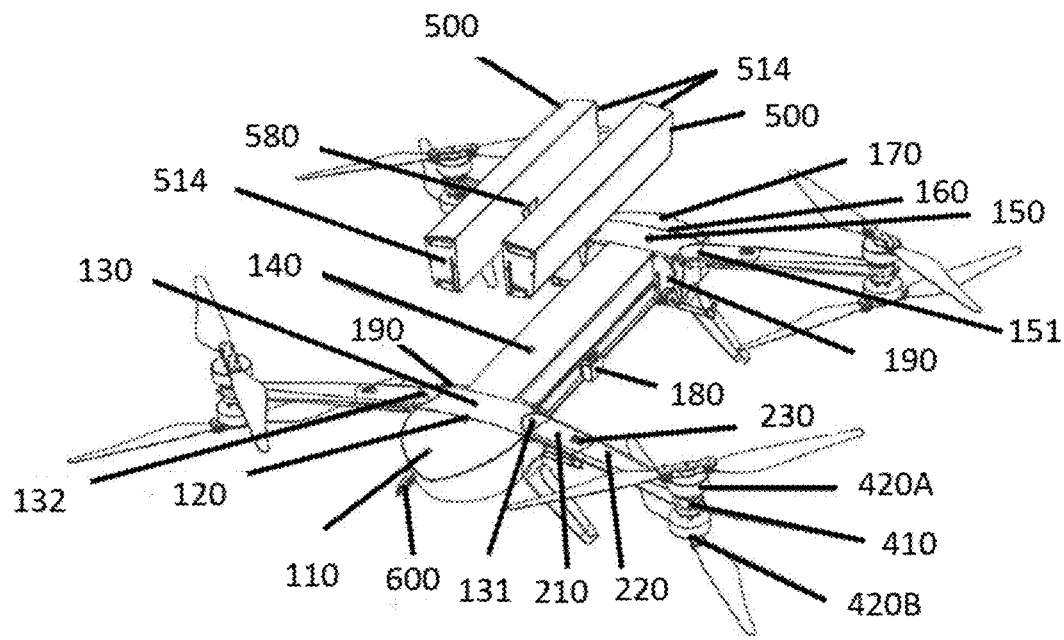
FIG. 3 is a third perspective view drawing, illustrating seen from above the embodiment of a multicopter drone according to the invention illustrated in FIGS. 1 and 2, modified with batteries removed from and elevated above the body of the drone.
Figure 4:
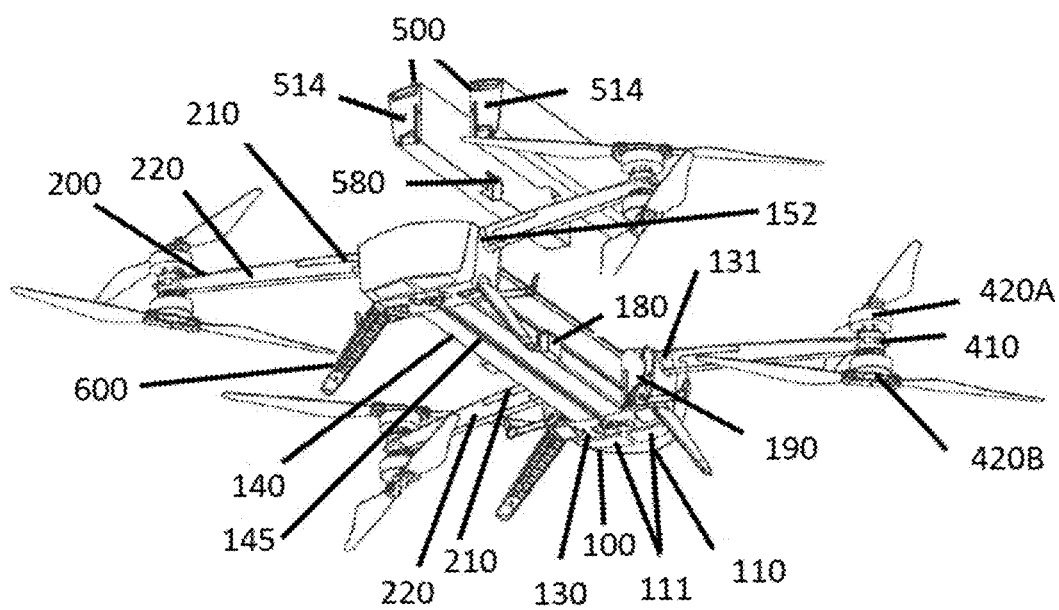
FIG. 4 is a fourth perspective view drawing, illustrating seen from below the embodiment of a multicopter drone according to the invention illustrated in FIGS. 1, 2 and 3 modified with batteries removed from and elevated above the body of the drone.
Figure 5:
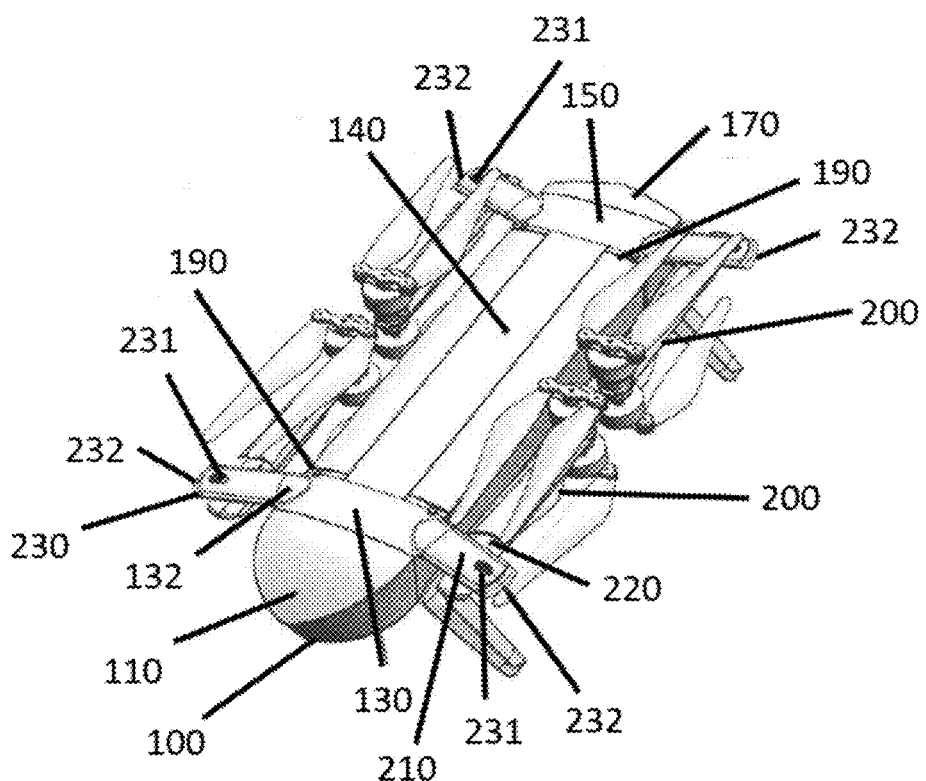
FIG. 5 is a first perspective view drawing, illustrating seen from above an embodiment of a multicopter drone according to the invention complete and folded for storage or transportation.
Figure 6:
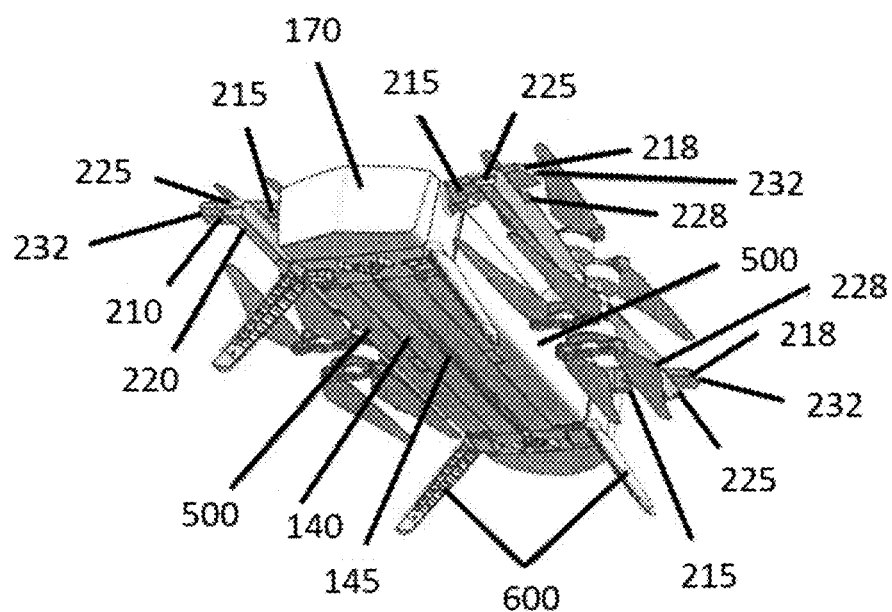
FIG. 6 is a second perspective view drawing, illustrating seen from below the embodiment of a multicopter drone according to the invention illustrated in FIG. 5.
Figure 7:
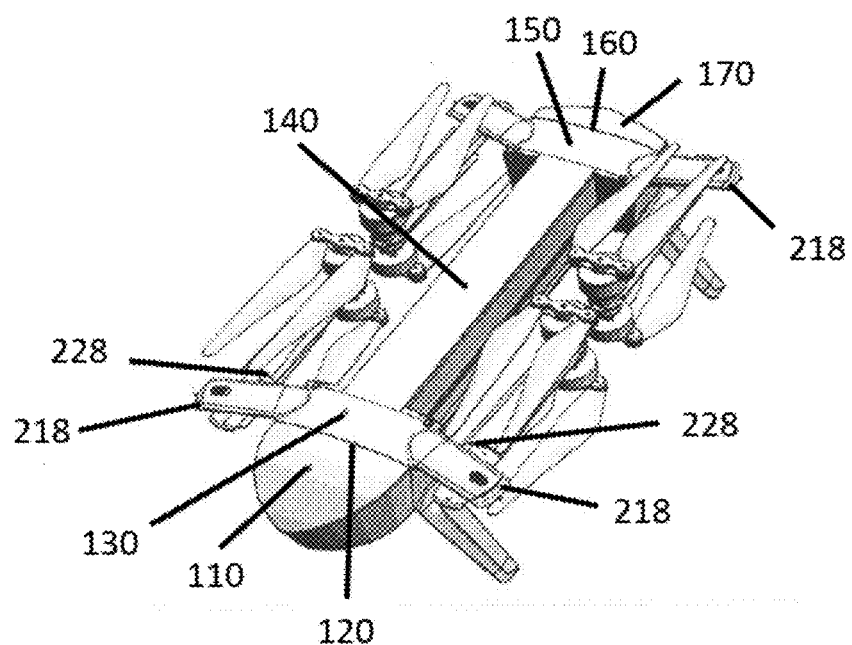
FIG. 7 is a third perspective view drawing illustrating seen from above the embodiment of a multicopter drone according to the invention illustrated in FIGS. 5 and 6 modified with batteries removed from the body of the drone.

FIGS. 3 and 4 show the body backbone 140 and forward shoulders 131 and 132, comprising adapters arranged on the forward end piece 130 arranged to provide for secure attachment of forward arms 200 to the body 100. Correspondingly, the rearward end piece 150 includes rearward shoulders 151 and 152 comprising adapters arranged on the rearward end piece 150 arranged to provide for secure attachment of rearward arms 200 to the body 100.

A battery connector 180 for electric connection is provided on at least one side of the backbone 140, adapted to provide electrical connection with a mating electrical connector 580 on the battery. Battery holding and locking means first parts 190 are disposed on respective ones of sides of the forward 130 and rearward 150 end pieces that are substantially perpendicular to a longitudinal axis of the body 100 and facing each other. Battery holding and locking means second parts 514, designed to cooperate and engage with the battery holding and locking means first parts 190, are disposed on respective ends of each battery 500. Referring to FIGS. 3 and 4, it should be noted that levers of the battery holding and locking means 190 are shown in a position for unlocking and releasing the batteries, and are seen as L-shaped elements protruding from lower edges of sides of the forward 130 and rearward 150 end pieces that are facing each other and are visible when batteries 500 are not installed between these sides on the body.

Reference is made to FIGS. 5 to 8, illustrating a rotor-wing multicopter according to the invention in a configuration with arms 200 folded against the body 100 and locked in a folded state, ready for storage or transportation. FIGS. 5 to 8 identify the lock slider 231 and the lock pin 232 of the arm folding hinge lock arrangement 230, the end portion 218 of the arm inner part 210 and the end portion 225 of the arm outer part 220 which both are of a shape that correspond to sections of a toroid, and the portion 215 of the arm inner part 210 and the portion 228 of the arm outer part 220 which are hollow toroidal sections and matchingly shaped to the end portions 225 and 218 so as to receive respective ones of the end portions 225 and 218, respectively, when the arm is rotated about the folding hinge from a folded to a deployed state. Thereby, forces such as torque and shear acting around and across the longitudinal axis of the arm are coupled directly between inner and outer arm parts 210, 220 without stressing the hinge pin around which the arm outer part is rotated when moving between folded and deployed positions.

Figure 8:
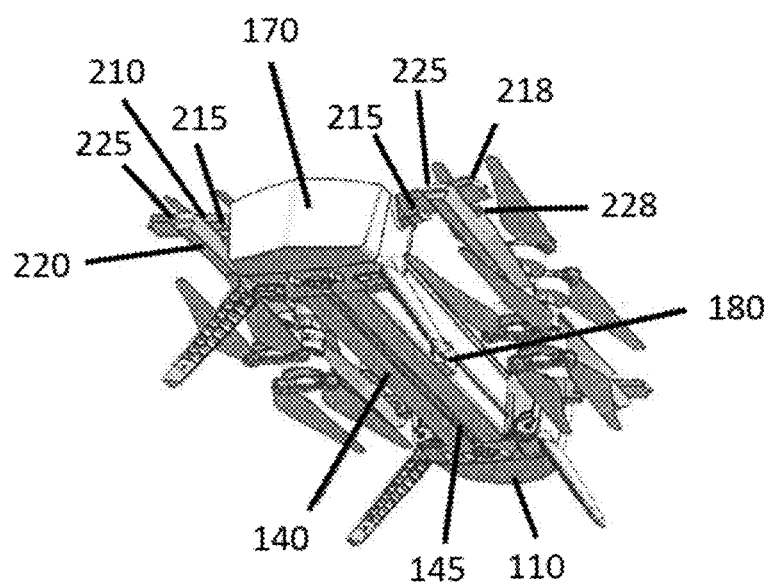
FIG. 8 is a fourth perspective view drawing illustrating seen from below the embodiment of a multicopter drone according to the invention illustrated in FIGS. 5, 6 and 7 modified with batteries removed from the body of the drone.

FIG. 8 also identifies a mounting track 145 in the unitary backbone 140 into which auxiliary equipment such as e.g. a camera foot may be mounted. It should be noted that in FIGS. 5 to 8, as well as in FIGS. 1 and 2, levers of the battery holding and locking means 190 are in position for locking and holding the batteries in place on the body, and that the L-shaped lever elements shown in FIGS. 3 and 4 protruding from lower edges of sides of the forward 130 and rearward 150 end pieces are in FIGS. 5 and 6, as well as in FIGS. 1 and 2, positioned in recesses in the forward 130 and rearward 150 end pieces and substantially hidden between these and respective adjacent end sides 514 of the batteries when batteries 500 are fully installed on the body.

Figure 9:
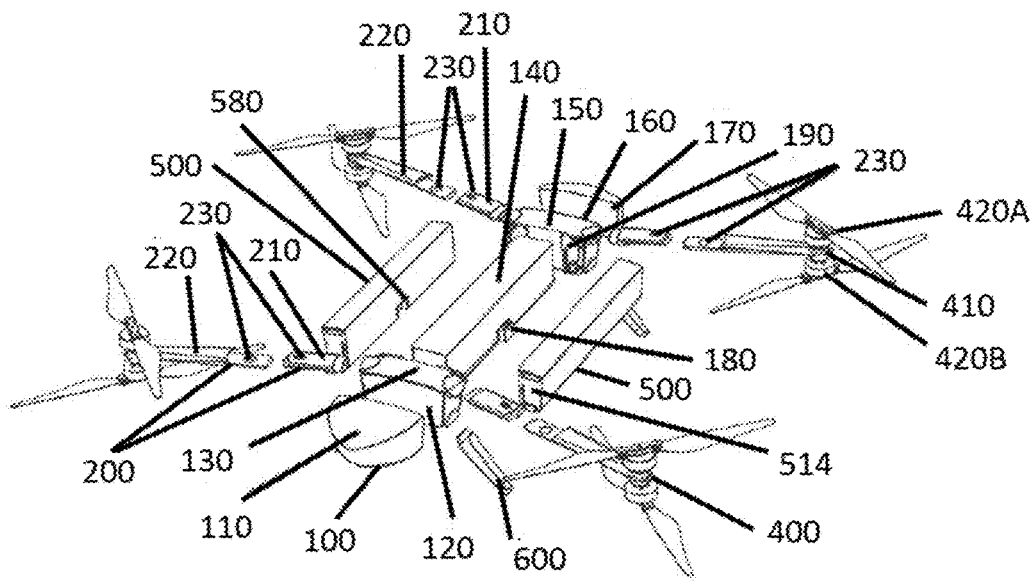
FIG. 9 is a first exploded view drawing illustrating seen in perspective from above the main components of the embodiment of a multicopter drone according to the invention illustrated in FIGS. 1, 2, 3 and 4.
Figure 10:
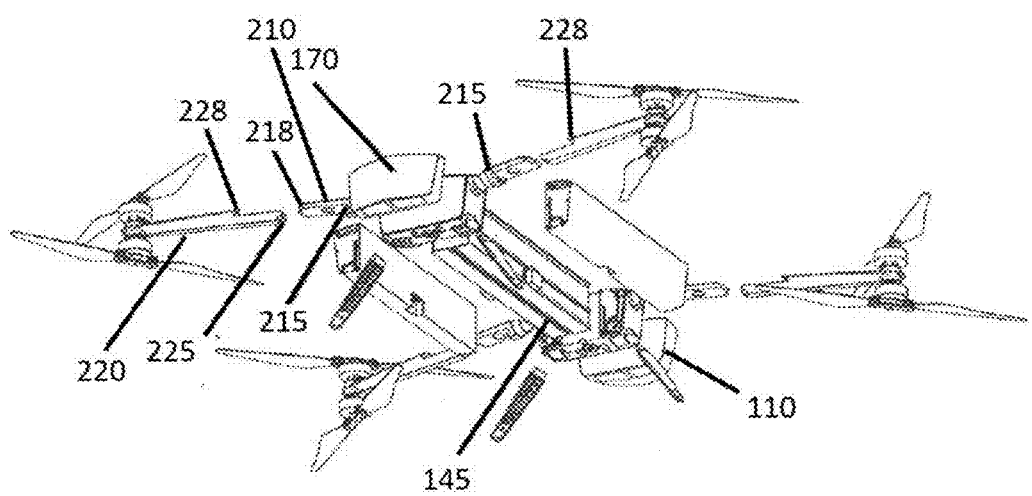
FIG. 10 is a second exploded view drawing illustrating seen in perspective from below the main components of the embodiment of a multicopter drone according to the invention illustrated in FIGS. 1, 2, 3, 4 and 9.

Reference is now made to FIGS. 9 and 10, in which main elements and sub-assemblies of a multicopter embodiment of the aerial vehicle of the invention are illustrated and identified. FIG. 9 shows elements and subassemblies of the body 100, such as bow end cap 110, optional forward adapter plate 120, forward end piece 130, body backbone 140 with electrical connector 180 for connecting to battery, rearward end piece 150 with parts of battery holding and locking arrangement 190, optional rearward adapter plate 160, and stern end cap 170, and elements and subassemblies of the rotor arm 200, such as arm inner part 210, arm folding hinge arrangement 230, and arm outer part 220, and elements and subassemblies of the rotors 400, such as motor mount 410, upper rotor assembly 420A, and lower rotor assembly 420B. FIG. 10 illustrates and identifies the end portions 218 of the arm inner parts 210 and the end portions 225 of the arm outer parts 220 which are both of a shape that correspond to partial sections of a toroid, and the portions 215 of the arm inner parts 210 and the portions 228 of the arm outer parts 220 which are in part hollow toroidal like shaped sections, matchingly shaped as complements to the end portions 225 and 218, so as to be capable of receiving respective ones of the end portions 225 and 218, respectively, when the arm is rotated about the folding hinge from a folded to a deployed state.

Figure 11:
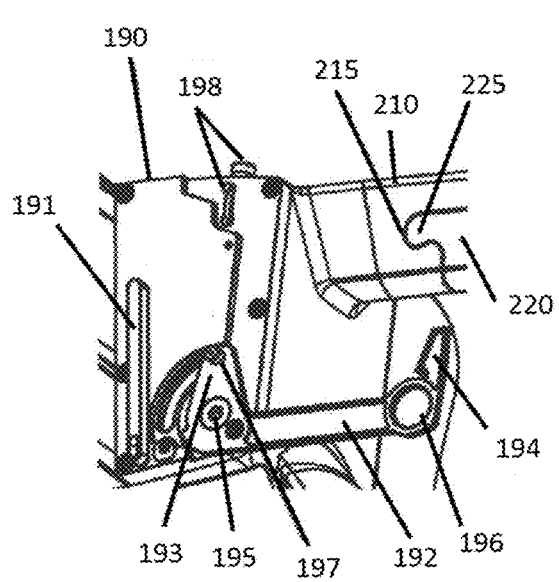
FIG. 11 is a first perspective view detail drawing illustrating in a released state a battery holding and locking arrangement of the multicopter drone according to the invention.
Figure 12:
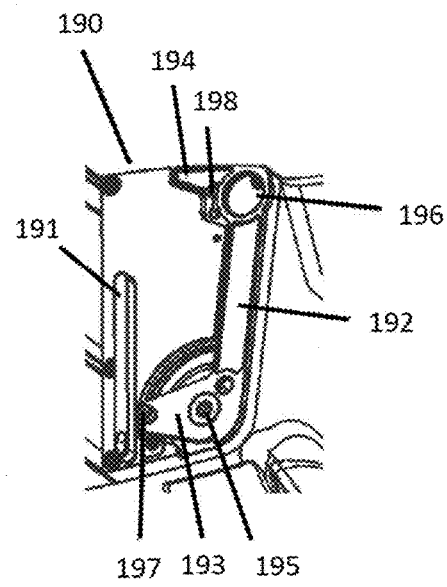
FIG. 12 is a second perspective view detail drawing illustrating in a locked state the battery holding and locking arrangement of the multicopter drone according to the invention also illustrated in FIG. 11.
Figure 13:
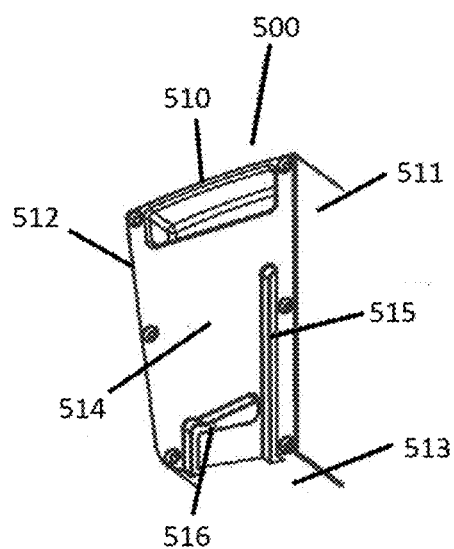
FIG. 13 is a first perspective view detail drawing of elements of the battery locking arrangement on an end portion of a battery for a multicopter drone according to the invention.

Reference is now made to FIGS. 11 and 12, which illustrate and identify elements and sub-assemblies of battery locking means 190 parts to be disposed at a side of the forward 130 and rearward 150 end pieces of a multicopter embodiment of the aerial vehicle of the invention, and to FIG. 13 in which are illustrated and identified elements and sub-assemblies of battery holding and locking arrangement parts located at short sides 514 at ends of the elongate battery 500.

FIGS. 11 and 12 illustrate and identify a rail 191, and a lever 192 with finger grab opening 196, lever rotation axis and bearing 195, carrier stud 193, and lever latching cam 194, and a lever latching pin and release button assembly 198. For convenience, next reference is made to FIG. 13, which illustrate and identifies features of battery 500 including a top long side 510, an inner long side 511, an outer long side 512, a bottom long side 513, and an end short side 514 of a battery 500, and on the end short side 514 comprising parts of the battery holding and locking means including a straight first recessed track 515 and an L-shaped second recessed track 516, both tracks having end openings at an edge of the bottom long side 513. The straight first recessed track 515 is dimensioned to receive at its opening the rail 191 to control the battery 500 to slide onto the body 100 and is positioned on the end short side 514 of the battery so as to position the battery next to a long side of the backbone 140 and position the electrical connector 580 of the battery in alignment with the electrical connector 180 of the body 100.

The opening of the L-shaped second recessed track 516 is positioned on the end short side 514 of the battery so as to be capable of receiving the carrier stud 193 on the lever 192 positioned in the unlock and release position as illustrated in FIG. 11. The corner of the L-shaped second recessed track 516 is positioned so as to meet the carrier stud 193 when the battery has sledded along the rail 191 till the point where the electrical connector 580 is about to make contact with the electrical connector 180, at which point the carrier stud 193 stops further movement of the battery until the lever is rotated about its rotation axis and bearing 195. Then, rotation of the lever towards its battery locking position makes the carrier stud 193 follow a circular path, and limited by horizontal portion of the L-shaped second recessed track 516, the carrier stud 193 brings the battery 500 along and with leverage drives it to move further to a point at which the top 510 and bottom 513 long sides of the battery are substantially flush with respective top and bottom long sides of the backbone 140 and the electrical connector 580 of the battery is fully mated with and connected to the electrical connector 180 of the body.

Conversely, for a battery 500 already installed on the body 100 in a held and locked position, by rotation of the lever towards the unlock and release position, the carrier stud 193 follows the circular path in an opposite direction, and limited by horizontal portion of the L-shaped second recessed track 516, the carrier stud 193 brings the battery 500 along and with leverage drives it to move further to a point at which the top 510 and bottom 513 long sides of the battery are elevated with respective top and bottom long sides of the backbone 140 and the electrical connector 580 of the battery is fully lifted out and disconnected to the electrical connector 180 of the body. On entering the position for holding and locking the battery 500, the lever latching cam 194 contacts the spring biased lever latching pin of the lever latching pin and release button assembly 198, and displaces the lever latching pin until the lever is rotated to the point at which the lever latching pin drops into a recessed portion of the cam at a root of the cam, thereby latching the lever 192 secured in its position for holding and locking the battery 500 in place on the body 100. The displacement of the lever latching pin by the cam also displaces the release button of the lever latching pin and release button assembly 198 for the release button to be retracted into the respective end piece 130, 150. Sides of the release body that become hidden as the cam effects retraction of the release button are advantageously painted in a signal colour, thus providing when not retracted into the respective end piece a clearly visible signal of incorrectly positioned and non-latched lever.

Figure 14:
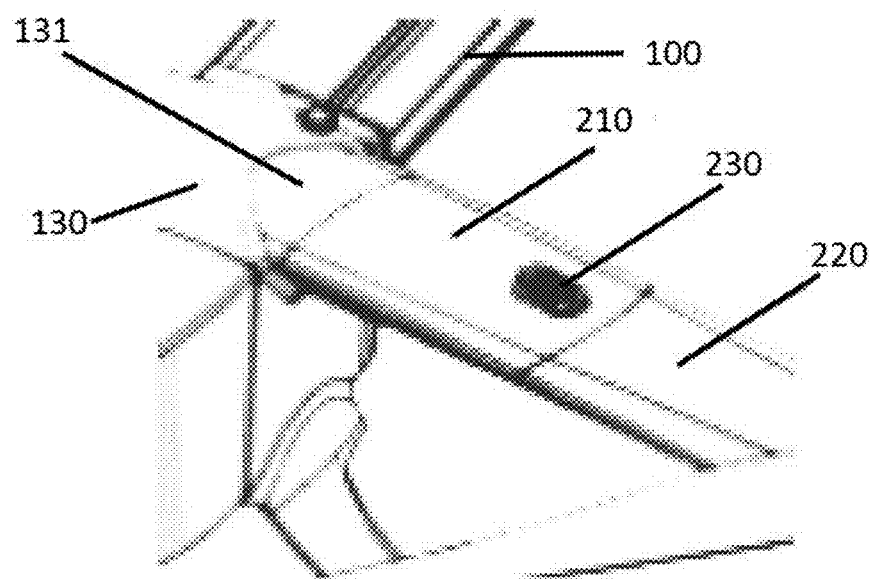
FIG. 14 is a first perspective view detail drawing illustrating in a deployed state a forward arm folding hinge portion of a rotor arm for a multicopter drone according to the invention.
Figure 15:
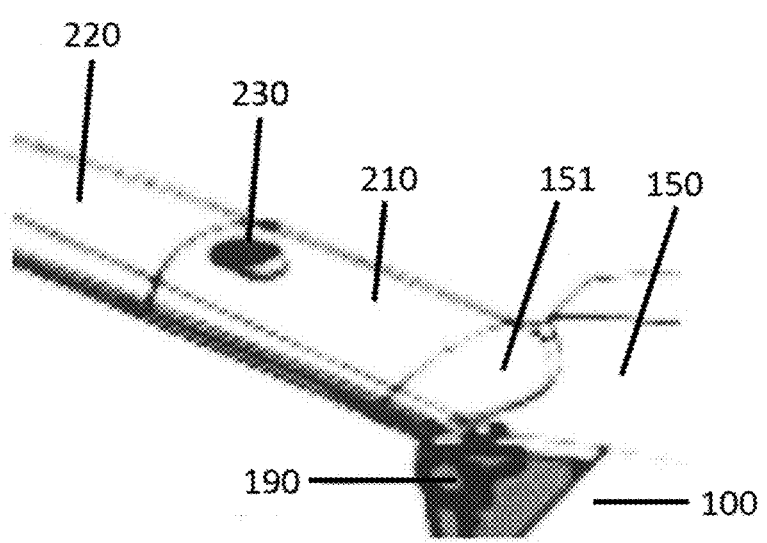
FIG. 15 is a first perspective view detail drawing illustrating in a deployed state a rearward arm folding in hinge portion of a rotor arm for a multicopter drone according to the invention.

Reference is now made to FIGS. 14 and 15, which illustrate and identify in more detail forward 131 and rearward 151 shoulder portions of the forward 130 and rearward 150 end pieces that are adapted to receive and secure to the body 100 inner ends of arm inner parts 210, and constellation of arm inner parts 210, arm outer parts 220 and arm folding hinge arrangement 230 when arms 200 are fully unfolded and deployed ready for flight.

Figure 16:
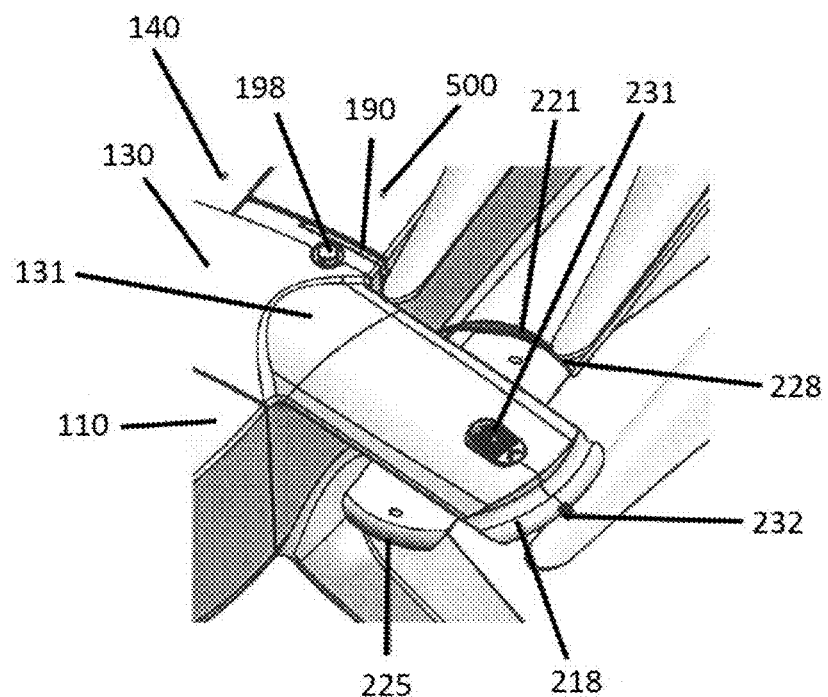
FIG. 16 is a first perspective view detail drawing illustrating in a folded state a forward arm folding hinge portion of a rotor arm for a multicopter drone according to the invention.
Figure 17:
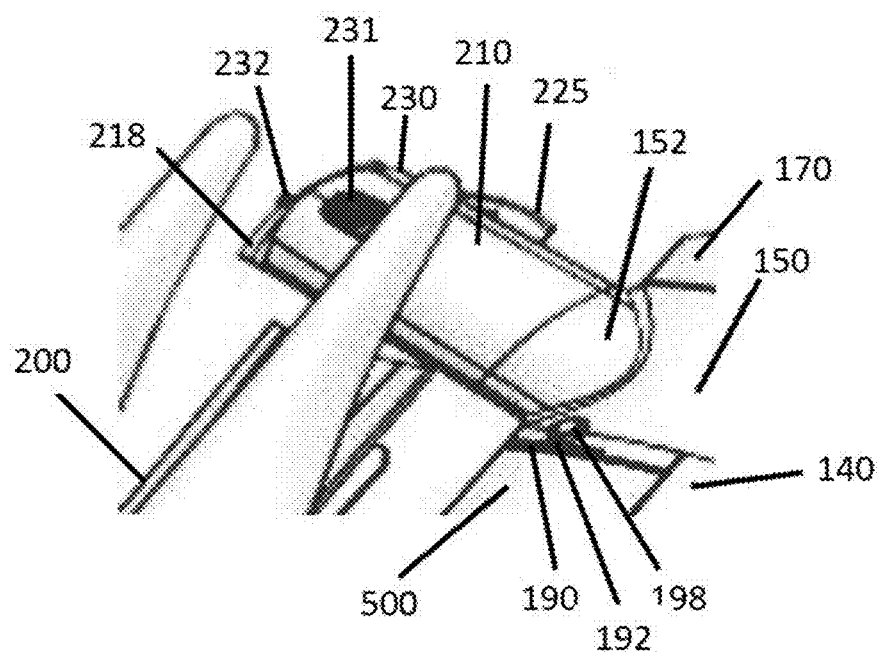
FIG. 17 is a first perspective view detail drawing illustrating in a folded state a rearward arm folding in hinge portion of a rotor arm for a multicopter drone according to the invention.

Reference is now made to FIGS. 16 and 17, which illustrate and identify in more detail forward 131 and rearward 151 shoulder portions of the forward 130 and rearward 150 end pieces that are adapted to receive and secure to the body 100 inner ends of arm inner parts 210, and constellation of arm inner parts 210, arm outer parts 220 and arm folding hinge arrangement 230 when arms 200 are fully folded in and ready for storage or transportation. In this constellation is also shown locking means slider 231 operable to bring arm locking pin 232 in from its idle position at which it protrudes from an outer end of the arm inner part 210, and arm locking pin receiving opening 221 on the arm outer part 220 into which opening 221 the arm locking pin 232 is protruding to secure the arm 200 in the fully unfolded and deployed ready for flight position. FIGS. 16 and 17, further illustrate release buttons fully retracted into respective end piece 130, 150, indicating levers 192 of the respective battery holding and locking means 190 are properly positioned to hold and lock battery 500.

Figure 18:
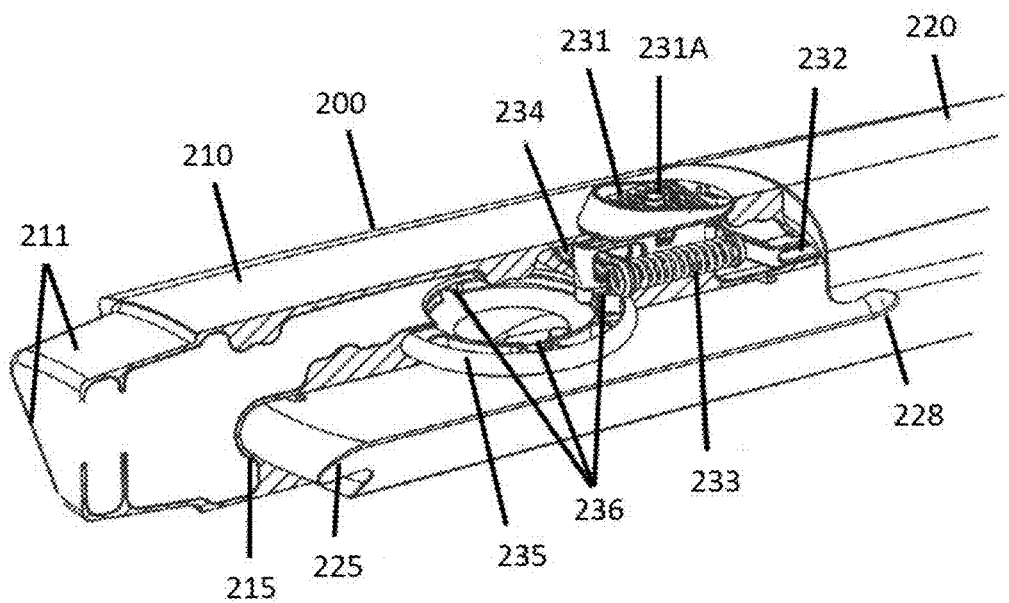
FIG. 18 is a first cross section view detail drawing illustrating seen in a first perspective from above in a deployed state a forward arm folding hinge portion of a rotor arm for a multicopter drone according to the invention.
Figure 19:
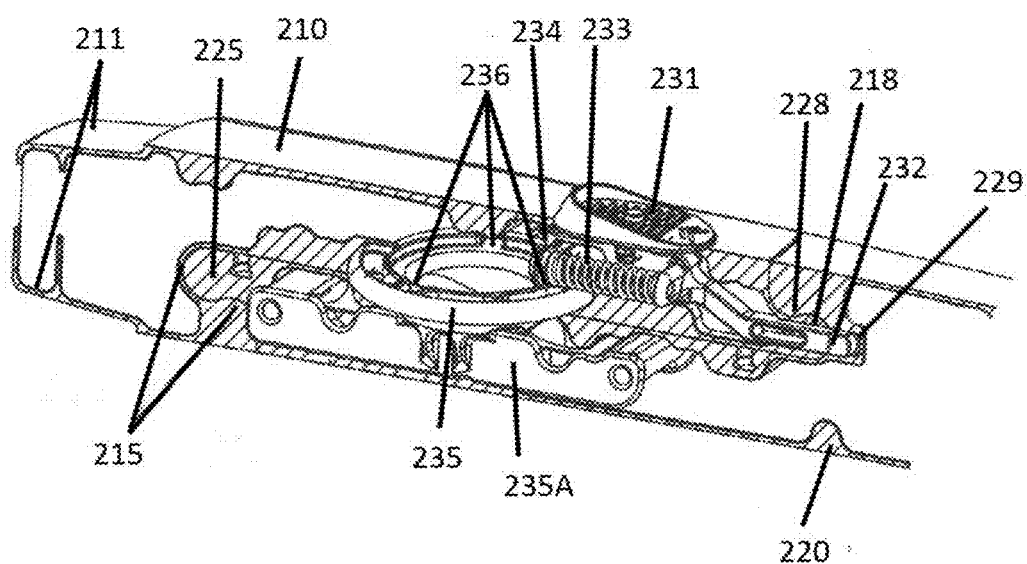
FIG. 19 is a second cross section view detail drawing illustrating seen in a second perspective from above in a deployed state the rearward arm folding in hinge portion of a rotor arm for a multicopter drone according to the invention also illustrated in FIG. 17.

Reference is now made to FIGS. 18 and 19, which illustrate and identify in more detail arm folding hinge and locking arrangements with rotor arms in the fully unfolded and deployed and locked in this position when ready for flight. Axis of rotation for the folding of arms 200 is defined by a hinge ring 235 which is attached to inner arm part 210 by ring mount 235A positioned within arm outer part 220. A ring shaped cavity of the arm inner part 210 forms a race for the hinge ring 235, thereby providing a hinge allowing the arm inner 210 and outer 220 parts to remain connected and rotatable with respect to each other in all positions from fully folded in to fully unfolded and deployed positions. Arm locking pin 232 is connected to slider 231, and springs 233 provides bias to the arm lock slider 231 so as to keep it in an idling position at which the arm locking pin 232 is protruding into arm locking opening 221 arranged in the arm outer part 220.

An interlock button 231A is provided in the arm lock slider 231 to blocking of any inadvertent movement the slider 231 until unblocked by a pushing of the interlock button 231A. A locking cam 234 is connected to slider 231 and positioned for lodging into one of a plurality of locking slot 236 provided on the hinge ring 235. Thereby, locking cam 234 and locking slot 236 proved a further means for keeping the arm parts locked in position in the fully unfolded and deployed position. At least one locking slot 236 is provided at an angular position of the hinge ring for allowing the locking cam to be lodged in the locking slot when the arm is fully folded, thereby proving locking of an arm outer part relative to a respective arm inner part also in the folded position to block the arms from unfolding inadvertently, e.g. during handling for transportation, maintenance, storage or other situations. FIGS. 18 and 19 also show inner portion 211 of the arm inner parts 210, constituted by a tapered off section shaped to fit with a matchingly shaped tapered off opening in an end piece part of the body, such as e.g. shoulder 131, shoulder 132 and shoulder 151. Advantageously, the end portion 211 of the arm inner parts 210 has a cross section outline corresponding to the shape of a trapezium, with a cross section at a tip of the end portion 211 that is smaller than cross section further in from the tip.

I shall be understood that the invention has been explained by way of example and with reference to embodiments of the invention, and that other embodiments that implement the inventive principles and aspects of the invention are also contemplated within the scope of the claims. As an example, a UAV implementing the invention may be an embodiment in which only upper motor and propeller assemblies 420A or only lower motor and propeller assemblies 420B are included. Similarly, motor supports may be oriented differently from what has been disclosed herein, and the arm parts may be of different design, although only one design has been shown to illustrate and explain the invention.

The invention claimed is:
1. An unmanned aerial vehicle, comprising:
  a main body comprising at least an elongate main frame ("backbone") with a forward end piece and a rearward end piece;
  wherein the end pieces are wider than the backbone and comprising coupling facilities for respective rotor arms, each rotor arm configured for supporting motor and propeller assemblies;
  a pair of elongated batteries;

wherein the end pieces and at least a portion of the backbone form a receptacle on two opposite sides of the backbone for releasably receiving the elongated batteries;

wherein the elongated batteries, the backbone and the end pieces form an elongate and substantially rectangular body assembly;

battery holding and locking parts arranged at a side of the forward and rearward end pieces for releasable locking engagement with corresponding battery holding and locking arrangement parts located at short sides at ends of the elongated batteries; and wherein the battery holding and locking parts are substantially perpendicular to a longitudinal axis of the main body and facing each other.

2. The unmanned aerial vehicle of claim 1, wherein each rotor arm comprises an arm inner part having on one end a coupling arrangement adapted for coupling to the end piece and on a second end a first part of an arm folding hinge, and an arm outer part having on one end an adapter for said motor and propeller assemblies and on a second end a second part of the arm folding hinge, and a displaceable and spring biased hinge lock arrangement disposed in a first one of the arm inner and outer parts.

3. The unmanned aerial vehicle of claim 2, further comprising a spring biased cotter pin adapted to enter a hole in a second one of the arm inner and outer parts when aligned in an unfolded position.

4. The unmanned aerial vehicle of claim 1, further comprising a rail, and a lever with finger grab opening, lever rotation axis and bearing, carrier stud, and lever latching cam, and a lever latching pin and release button assembly.

5. The unmanned aerial vehicle of claim 1, wherein the elongated batteries comprise a top long side, an inner long side, an outer long side, a bottom long side, and an end short side, and wherein the end short side comprises parts of the battery holding and locking arrangement parts including a straight first recessed track and an L-shaped second recessed track, both tracks having end openings at an edge of the bottom long side.

6. The unmanned aerial vehicle of claim 5, wherein the straight first recessed track is dimensioned to receive at an end opening a rail to control the elongated batteries to slide onto the main body and is positioned on the end short side of the elongated batteries so as to position the elongated batteries next to a long side of the backbone and position an electrical connector of the battery elongated batteries in alignment with an electrical connector of the main body.

7. The unmanned aerial vehicle of claim 6, wherein the opening of the L-shaped second recessed track is positioned on the end short side of the elongated batteries so as to be capable of receiving a carrier stud on a lever positioned in an unlock and release position.

8. The unmanned aerial vehicle of claim 7, wherein a corner of the L-shaped second recessed track is positioned so as to meet the carrier stud when the elongated batteries have sledded along the rail till a point where the electrical connector is about to make contact with the electrical connector, at which point the carrier stud stops further movement of the elongated batteries until the lever is rotated about is a rotation axis and bearing of the lever.

9. The unmanned aerial vehicle of claim 8, wherein a rotation of the lever towards a battery locking position makes the carrier stud follow a circular path, and limited by horizontal portion of the L-shaped second recessed track, the carrier stud brings the elongated batteries along and with leverage drives the elongated batteries to move further to a point at which the top and bottom long sides of the elongated batteries are substantially flush with respective top and bottom long sides of the backbone and the electrical connector of the elongated batteries is fully mated with and connected to the electrical connector of the main body.

10. The unmanned aerial vehicle of claim 9, wherein when elongated batteries already are installed on the main body in a held and locked position, by rotation of the lever towards the unlock and release position, the carrier stud follows the circular path in an opposite direction, and limited by horizontal portion of the L-shaped second recessed track, the carrier stud brings the elongated batteries along and with leverage drives the elongated batteries to move further to a point at which the top and bottom long sides of the elongated batteries are elevated with respective top and bottom long sides of the backbone and the electrical connector of the elongated batteries is fully lifted out and disconnected to the electrical connector of the main body.

\* \* \* \* \*